US009997083B2

(12) United States Patent
Moghaddam et al.

(10) Patent No.: US 9,997,083 B2
(45) Date of Patent: Jun. 12, 2018

(54) CONTEXT-AWARE RECOMMENDATION SYSTEM FOR ADAPTIVE LEARNING

(71) Applicant: Samsung Electronics Co., Ltd., Suwon-si, Gyeonggi-do (KR)

(72) Inventors: Saeed Abbasi Moghaddam, San Jose, CA (US); Emmanuel M. Tapia, Newark, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 14/289,880

(22) Filed: May 29, 2014

(65) Prior Publication Data
US 2015/0348432 A1   Dec. 3, 2015

(51) Int. Cl.
G09B 5/00   (2006.01)
G09B 7/00   (2006.01)
G09B 5/12   (2006.01)
G09B 7/04   (2006.01)

(52) U.S. Cl.
CPC ................... G09B 5/12 (2013.01); G09B 7/04 (2013.01)

(58) Field of Classification Search
CPC .............. G09B 5/00; G09B 5/06; G09B 7/00
USPC ................. 434/322, 323, 350, 362
See application file for complete search history.

(56) References Cited

U.S. PATENT DOCUMENTS

| | | | |
|---|---|---|---|
| 6,733,295 B2 | 5/2004 | Stuppy et al. | |
| 7,909,752 B2 * | 3/2011 | Bottomley | G09B 5/04 600/26 |
| 8,342,854 B2 | 1/2013 | Parmer et al. | |
| 8,699,939 B2 | 4/2014 | German et al. | |
| 8,924,327 B2 * | 12/2014 | Bazanov | G09B 7/00 706/45 |
| 2003/0113698 A1 * | 6/2003 | Von der Geest | G09B 7/00 434/322 |
| 2007/0172809 A1 | 7/2007 | Gupta | |
| 2007/0180428 A1 | 8/2007 | Behrmann et al. | |
| 2008/0050715 A1 | 2/2008 | Golczewski et al. | |
| 2008/0206726 A1 * | 8/2008 | Kalisvaart | G09B 7/02 434/247 |
| 2009/0311658 A1 | 12/2009 | Polivka | |
| 2011/0177480 A1 | 7/2011 | Menon et al. | |
| 2011/0256521 A1 | 10/2011 | Mansfield et al. | |
| 2012/0164621 A1 | 6/2012 | Katz et al. | |
| 2012/0329027 A1 | 12/2012 | Lewolt | |
| 2013/0011822 A1 | 1/2013 | Messner et al. | |

(Continued)

FOREIGN PATENT DOCUMENTS

EP   2199963 A1   6/2010
WO   2013046220 A2   4/2013

*Primary Examiner* — Nikolai A Gishnock
(74) *Attorney, Agent, or Firm* — Sherman IP LLP; Kenneth L. Sherman; Hemavathy Perumal (57) ABSTRACT

One embodiment provides a system comprising at least one learner application module for receiving feedback data from at least one user via at least one electronic device, about information presented to the users by a presenter. The system further comprises at least one sensor for capturing contextual data associated with the users. The system further comprises a recommendation provider for collecting feedback data and contextual data from each learner application module and each sensor, respectively. The recommendation provider determines at least one personalized recommendation for each user based on the collected data and the presented information.

20 Claims, 8 Drawing Sheets

(56) References Cited

U.S. PATENT DOCUMENTS

| | | |
|---|---|---|
| 2013/0095461 A1 | 4/2013 | Menon et al. |
| 2013/0096892 A1 | 4/2013 | Essa et al. |
| 2013/0196306 A1 | 8/2013 | Tetreau |
| 2014/0317135 A1* | 10/2014 | Stivoric ............ G06F 17/30598 707/758 |
| 2014/0335497 A1* | 11/2014 | Gal .......................... G09B 7/00 434/323 |
| 2016/0019813 A1* | 1/2016 | Mullen .................. G09B 19/00 434/236 |

* cited by examiner

CONTEXT-AWARE RECOMMENDATION SYSTEM FOR ADAPTIVE LEARNING

TECHNICAL FIELD

One or more embodiments relate generally to interactive learning, and in particular, a context-aware recommendation system for adaptive learning.

BACKGROUND

Learners, such as students, may utilize electronic devices as interactive teaching tools for adaptive learning. The devices may adapt presentation of educational material based on the learning needs of the learners.

SUMMARY

One embodiment provides a system comprising at least one learner application module for receiving feedback data from at least one user via at least one electronic device, about information presented to the users by a presenter. The system further comprises at least one sensor for capturing contextual data associated with the users. The system further comprises a recommendation provider for collecting feedback data and contextual data from each learner application module and each sensor, respectively. The recommendation provider determines at least one personalized recommendation for each user based on the collected data and the presented information.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Figure 1:
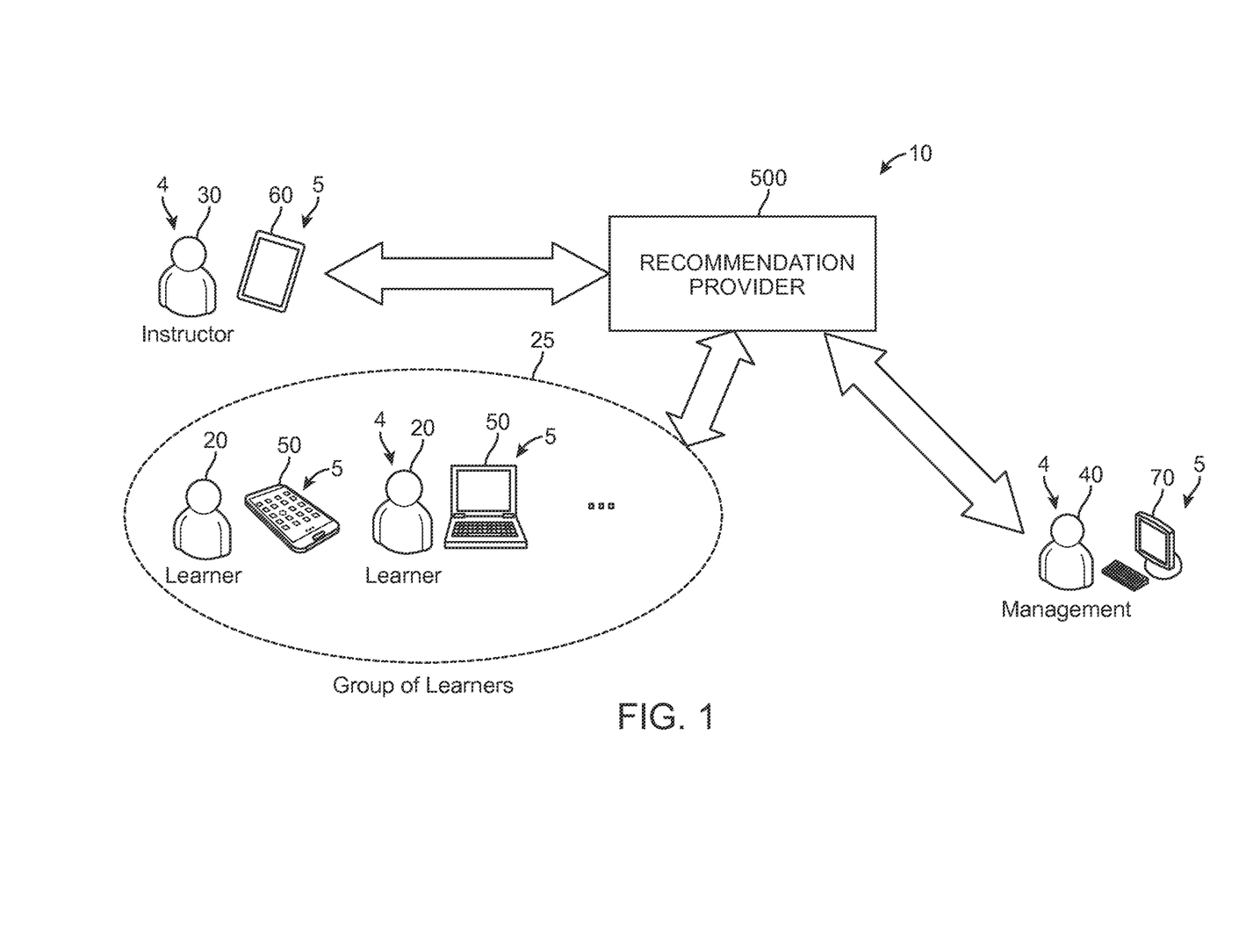
FIG. 1 illustrates an example context-aware recommendation system, in accordance with an embodiment of the invention.

FIG. 1 illustrates an example context-aware recommendation system 10, in accordance with an embodiment of the invention. The system 10 comprises multiple electronic devices 5. Each electronic device 5 represents an electronic device of a user client 4. An electronic device may be an appliance (e.g., a television (TV) such as a smart TV), a personal computer (PC), a server, or a mobile device (e.g., a mobile phone such as a smart phone, a laptop computer, a tablet).

A user client 4 may be a learner user client ("learner") 20, an instructor user client ("instructor") 30 or a management user client ("management user") 40. An instructor 30 presents information to one or more learners 20. The information presented may represent different types of information, such as educational material, training material, etc. For example, each learner 20 may represent a student/trainee of a learning/training institution, such as an educational institution (e.g., a university, an educational/online-learning website, etc.). Each instructor 30 may represent an instructor/trainer (e.g., a teacher, a professor) for the learning/training institution. A management user 40 represents a management entity/official (e.g., a management department, a department head, a principal) for the learning/training institution.

In one embodiment, the system 10 comprises at least one instructor 30, at least one management user 40, and a group 25 of learners 20. The group 25 may represent a classroom of learners 20 at a learning/training institution. Each user client 4 has a corresponding electronic device 5 that the user client 4 may utilize as an interactive learning tool.

For example, as shown in FIG. 1, each instructor 30 has a corresponding instructor device 60, each learner 20 has a corresponding learner device 50, and each management user 40 has a corresponding management device 70.

A learner 20 may interact with a corresponding learner device 50 to input learner feedback during or after presentation of information by an instructor 30 (e.g., a training/teaching session). Each learner device 50 of each learner 20 comprises at least one sensor 80 (FIG. 2) for capturing contextual data associated with the learner 20.

An instructor 30 may interact with a corresponding instructor device 60 to provide instructor annotations during the training/teaching session. Each instructor device 60 of each instructor 30 may comprise at least one sensor 80 (FIG. 3) for capturing contextual data associated with the instructor 30.

The system 10 further comprises a recommendation provider 500. The recommendation provider 500 receives at least the following input data streams: learner feedback from at least one learner 20, instructor annotations from at least one instructor 30, and contextual data captured by sensors 80 residing on at least one learner device 50 and/or instructor device 60. Based on the input data streams received, the recommendation provider 500 provides personalized (i.e., customized) learner recommendations, instructor recommendations and management recommendations for each learner 20, each instructor 30, and each management user 40.

In one embodiment, each user client device 4 exchanges data with the recommendation provider 500 over a connection (e.g., a wireless connection, a wired connection, or a combination of the two).

Figure 2:
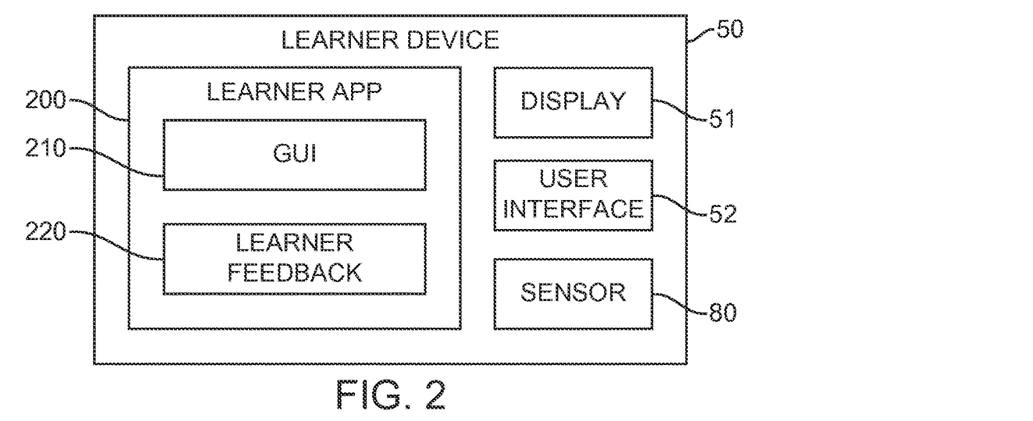
FIG. 2 illustrates an example learner device for a learner, in accordance with an embodiment of the invention.

FIG. 2 illustrates an example learner device 50 for a learner 20, in accordance with an embodiment of the invention. The learner device 50 comprises a display unit 51 for displaying data and a user interface unit 52 for enabling user interaction. In one embodiment, the user interface unit 52 comprises one or more of the following: a keyboard, a keypad, a pointing device, a touch interface, etc. The learner 20 provides learner feedback via the user interface unit 52.

The learner device 50 further comprises at least one sensor 80 for capturing contextual data associated with the learner 20. The contextual data captured may include data such as where the learner 20 is located (e.g., where the learner 20 is sitting within a classroom), the time and/or day, and information identifying one or more environmental conditions associated with the learner 20, such as lighting conditions, noise conditions, temperature conditions and/or air pressure conditions of an environment surrounding the learner 20.

The learner device 50 further comprises a learner application module ("learner app") 200. The learner app 200 is a software application configured to run on the learner device 50. In one embodiment, the learner app 200 may be pre-loaded on the learner device 50 or may be downloaded from either the recommendation provider 500 or a third party.

The learner app 200 comprises a graphical user interface (GUI) unit 210 for generating at least one graphical user interface (GUI) for display on the display unit 51, and a learner feedback unit 220 for receiving learner feedback provided via the user interface 52.

In one embodiment, the learner app 200 generates GUIs that are related to a particular presentation and that prompt the learner 20 to provide learner feedback. The learner app 200 may gather multi-modal learner feedback from the learner 20, such as the feelings, moods and needs of the learner 20. For example, the learner feedback gathered may indicate whether the learner 20 is interested in/excited by the presented information, whether the learner 20 is confused about the presented information, whether the learner 20 needs another example to understand the presented information, whether the learner 20 is sleepy, etc.

The learner app 200 transmits the learner feedback gathered to the recommendation provider 500. The learner app 200 may also transmit contextual data captured by the sensors 80 residing on the learner device 50.

The learner app 200 may receive personalized recommendations for the learner 20 from the recommendation provider 500. The learner app 200 provides the recommendations to the learner 20 (e.g., by displaying the recommendations on the display unit 51).

In one embodiment, each personalized recommendation comprises a personalized learning recommendation for improving learning/training performance of the learner 20. For example, a personalized learning recommendation may comprise a recommendation to review additional information related to the presented information, a recommendation to adjust the time when the learner 20 reviews the presented information, a recommendation to adjust the location where the learner 20 reviews the presented information, and/or a recommendation to adjust an environmental factor affecting learning/training performance of the learner 20 (e.g., adjust lighting conditions, noise conditions, temperature conditions and/or air pressure conditions of an environment surrounding the learner 20).

Figure 3:
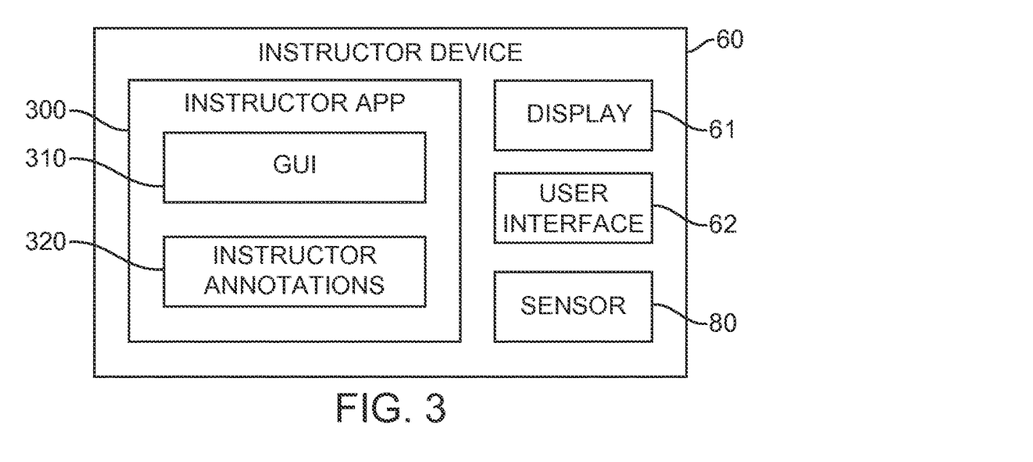
FIG. 3 illustrates an example instructor device for an instructor, in accordance with an embodiment of the invention.

FIG. 3 illustrates an example instructor device 60 for an instructor 30, in accordance with an embodiment of the invention. The instructor device 60 comprises a display unit 61 for displaying data and a user interface unit 62 for enabling user interaction. In one embodiment, the user interface unit 62 comprises one or more of the following: a keyboard, a keypad, a pointing device, a touch interface, etc. The instructor 30 provides instructor annotations via the user interface unit 62.

The instructor device 60 further comprises at least one sensor 80 for capturing contextual data associated with the instructor 30. The contextual data captured may include data such as where the instructor 30 is located (e.g., where the instructor 30 is standing within a classroom), the time and/or day, and information identifying one or more environmental conditions associated with the instructor 30, such as lighting conditions, noise conditions, temperature conditions and/or air pressure conditions of an environment surrounding the instructor 30.

The instructor device 60 further comprises an instructor application module ("instructor app") 300. The instructor app 300 is a software application configured to run on the instructor device 60. In one embodiment, the instructor app 300 may be pre-loaded on the instructor device 60 or may be downloaded from either the recommendation provider 500 or a third party.

The instructor app 300 comprises a graphical user interface (GUI) unit 310 for generating at least one graphical user interface (GUI) for display on the display unit 61, and an instructor annotations unit 320 for receiving instructor annotations provided via the user interface 62.

In one embodiment, the instructor app 300 generates GUIs that are related to a particular presentation and that prompt the instructor 30 to provide instructor annotations for the presentation. The instructor annotations may indicate a particular topic associated with the presentation, a particular activity associated with the presentation, and/or one or more learning pre-requisites associated with the presentation. For example, if the instructor 30 is teaching a math class, the topic may be linear algebra, the activity may be solving a linear algebra problem, and learning pre-requisites may included basic math skills.

The instructor app 300 transmits the instructor annotations to the recommendation provider 500. The instructor app 300 may also transmit contextual data captured by the sensors 80 residing on the instructor device 60.

The instructor app 300 may receive personalized recommendations for the instructor 30 from the recommendation provider 500. The instructor app 300 provides the recommendations to the instructor 30 (e.g., by displaying the recommendations on the display unit 61).

In one embodiment, each personalized recommendation comprises a personalized instructor recommendation for improving instructor performance of the instructor 30. For example, a personalized instructor recommendation may comprise a recommendation to provide additional examples when explaining a particular mathematical formula.

Figure 4:
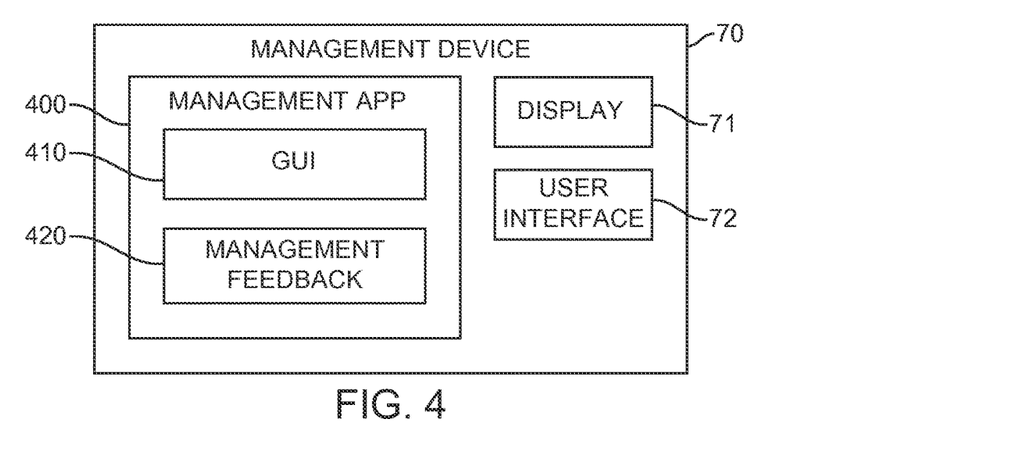
FIG. 4 illustrates an example management device for a management user, in accordance with an embodiment of the invention.

FIG. 4 illustrates an example management device 70 for a management user 40, in accordance with an embodiment of the invention. The management device 70 comprises a display unit 71 for displaying data and a user interface unit 72 for enabling user interaction. In one embodiment, the user interface unit 72 comprises one or more of the following: a keyboard, a keypad, a pointing device, a touch interface, etc. The management user 40 may provide management feedback via the user interface unit 72.

The management device 70 further comprises a management application module ("management app") 400. The management app 400 is a software application configured to run on the management device 70. In one embodiment, the management app 400 may be pre-loaded on the management device 70 or may be downloaded from either the recommendation provider 500 or a third party.

The management app 400 comprises a graphical user interface (GUI) unit 410 for generating at least one graphical user interface (GUI) for display on the display unit 71, and a management feedback unit 420 for receiving management feedback provided via the user interface 72.

In one embodiment, the management app 400 generates GUIs that are related to a particular presentation. For example, in one embodiment, the management app 400 generates GUIs that prompt the management user 40 to input management feedback. The management app 400 transmits management feedback provided via the user interface 72 to the recommendation provider 500. Examples of management feedback may include feedback on the behavior and/or characteristics of an instructor 30, information relating to instruction skills and/or certificates of an instructor 30, student records, information identifying a demographic of a classroom, information relating to amenities available within a classroom (e.g., smart white board, types of chairs, etc.), etc.

The management app 400 may receive personalized recommendations for the management user 40 from the recommendation provider 500. The management app 400 provides the recommendations to the management user 40 (e.g., by displaying the recommendations on the display unit 71).

In one embodiment, each personalized recommendation comprises a personalized management recommendation for improving the learning/training performance at an institution managed by said management user 40. For example, a personalized management recommendation may comprise a recommendation to adjust an environmental factor affecting learning/training performance of learners 20 within a particular classroom (e.g., adjust lighting conditions, noise conditions, temperature conditions and/or air pressure conditions of the classroom).

Figure 5:
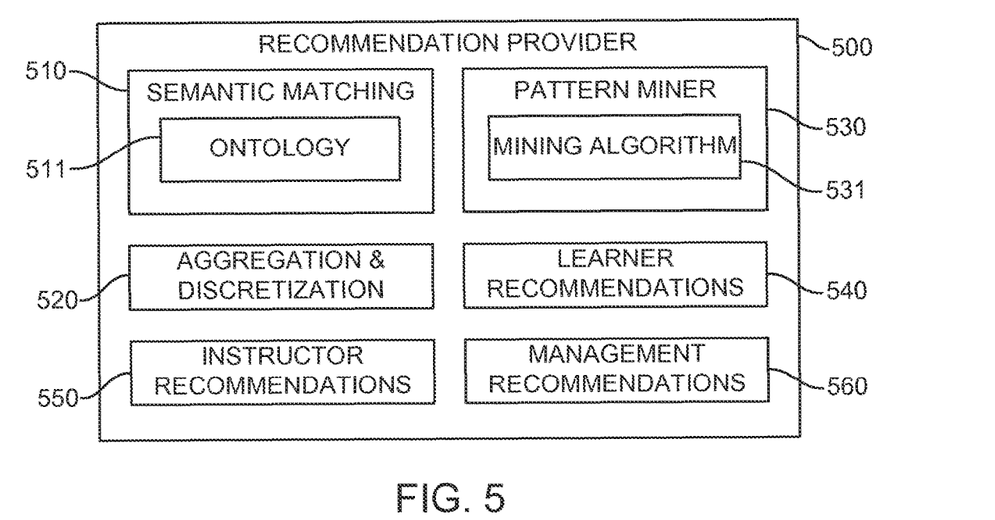
FIG. 5 illustrates an example recommendation provider, in accordance with an embodiment of the invention.

FIG. 5 illustrates an example recommendation provider 500, in accordance with an embodiment of the invention. The recommendation provider 500 comprises a semantic matching unit 510, an aggregation and discretization unit 520, a pattern miner unit 530, a learner recommendations unit 540, an instructor recommendations unit 550, and a management recommendations unit 560.

Different learners 20 may use different terms to describe similar feelings, moods and/or needs when providing learner feedback. The semantic matching unit 510 includes a database 511 for maintaining an ontology. The semantic matching unit 510 is configured to examine all information collected from the learners 20 and the instructor 30 against the ontology, and generate a unified view of the information collected.

The aggregation and discretization unit 520 aggregates all learner feedback, all instructor feedback and all contextual data collected into a multi-aspect data stream. The aggregation and discretization unit 520 discretizes the multi-aspect data stream into multiple temporal multi-aspect patterns for pattern mining.

The pattern miner unit 530 applies a pattern mining algorithm 531 to the multi-aspect patterns to determine factors leading to a particular situation (e.g., confusion amongst learners 20). In one embodiment, the pattern miner unit 531 applies the Apriori mining algorithm.

Based on the patterns determined by the pattern miner unit 530, the learner recommendations unit 540 generates personalized recommendations for each learner 20. In one embodiment, the learner recommendations unit 540 generates personalized learner recommendations for each learner 20 to improve the learning/training performance of the learner 20. The personalized learner recommendations may include suggested topics for the learner 20 to review, and/or suggestions for making the environment of the learner 20 more conducive to learning/training, such as changing the time and/or location of learning/training.

Based on the patterns determined by the pattern miner unit 530, the instructor recommendations unit 550 generates personalized recommendations for each instructor 30. In one embodiment, the instructor recommendations unit 550 generates personalized instructor recommendations for each instructor 30 to improve the training/teaching performance of the instructor 30. The personalized instructor recommendations may include recommendations like providing more examples when teaching a particular mathematical formula.

Based on the patterns determined by the pattern miner unit 530, the management recommendations unit 560 generates personalized recommendations for each management user 40. In one embodiment, the management recommendations unit 560 generates personalized management recommendations for each management user 40 to improve learning/training performance across all learners 20 at a learning/training institution managed by the management user 40. The personalized management recommendations may include suggestions for making a classroom/training environment more conducive to learning/training, such as minimizing construction noise within proximity of the classroom/training environment.

In one embodiment, the recommendation provider 500 maintains enriched datasets for each learner 20, each instructor 30 and each management user 40. The recommendation provider 500 may utilize the enriched datasets when providing personalized recommendations based on previously learned facts.

Figure 6A:
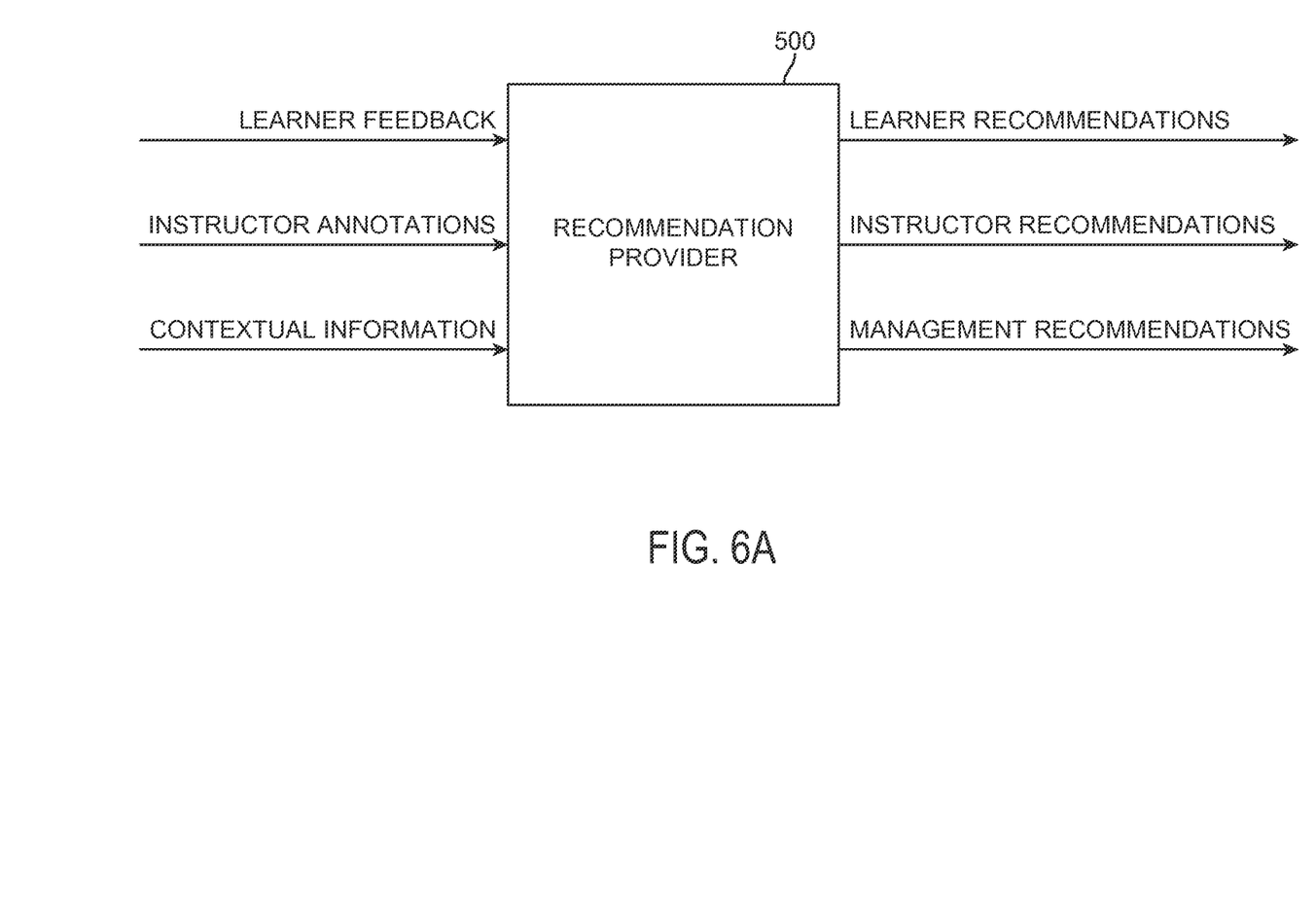
FIG. 6A illustrates example input and example output data streams for the recommendation provider, in accordance with an embodiment of the invention.

FIG. 6A illustrates example input and example output data streams for the recommendation provider 500, in accordance with an embodiment of the invention. The recommendation provider 500 is configured to receive at least the following input data streams: learner feedback from at least one learner 20, instructor annotations from the instructor 30, and contextual data captured by sensors 80 residing on at least one learner device 50 and/or instructor device 60.

Based on the input data streams received, the recommendation provider 500 provides personalized learner recommendations, instructor recommendations and management recommendations for at least one learner 20, at least one instructor 30, and at least one management user 40, respectively.

Figure 6B:
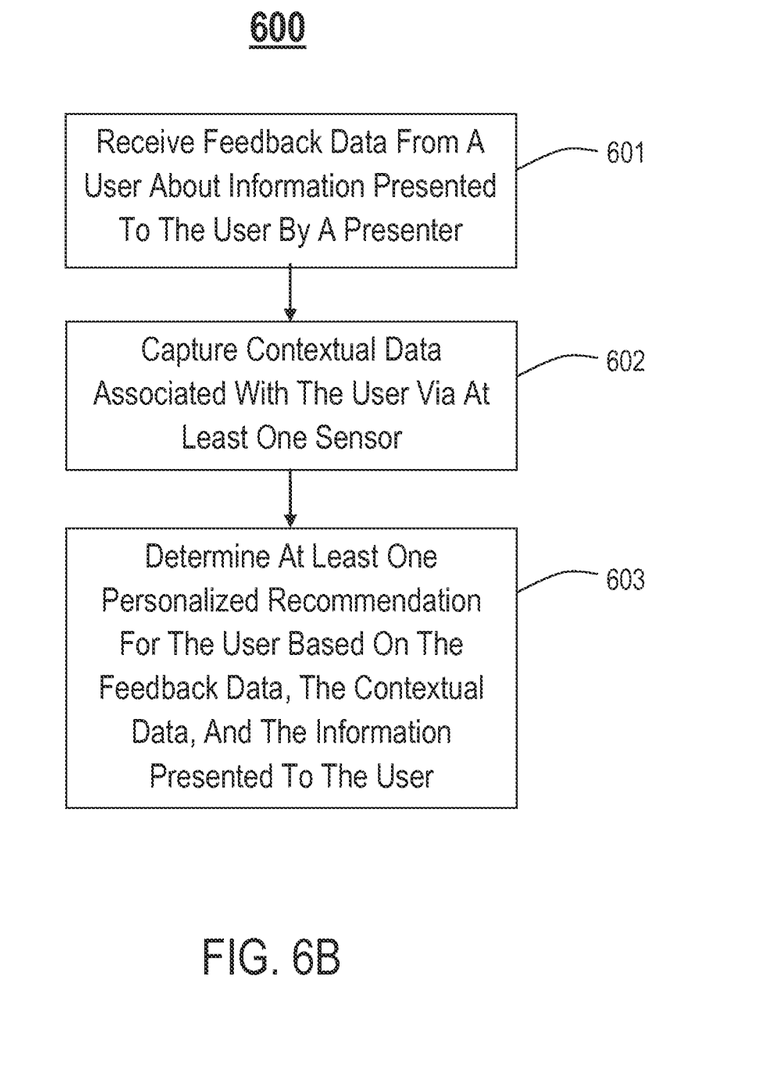
FIG. 6B illustrates a flowchart of an example process for providing personalized learner recommendations, in accordance with an embodiment of the invention.

FIG. 6B illustrates a flowchart of an example process 600 for providing personalized learner recommendations, in accordance with an embodiment of the invention. In process block 601, receive feedback data from a user about information presented to the user by a presenter. In process block 602, capture contextual data associated with the user via at least one sensor. In process block 603, determine at least one personalized recommendation for the user based on the feedback data, the contextual data, and the information presented to the user.

Figure 6C:
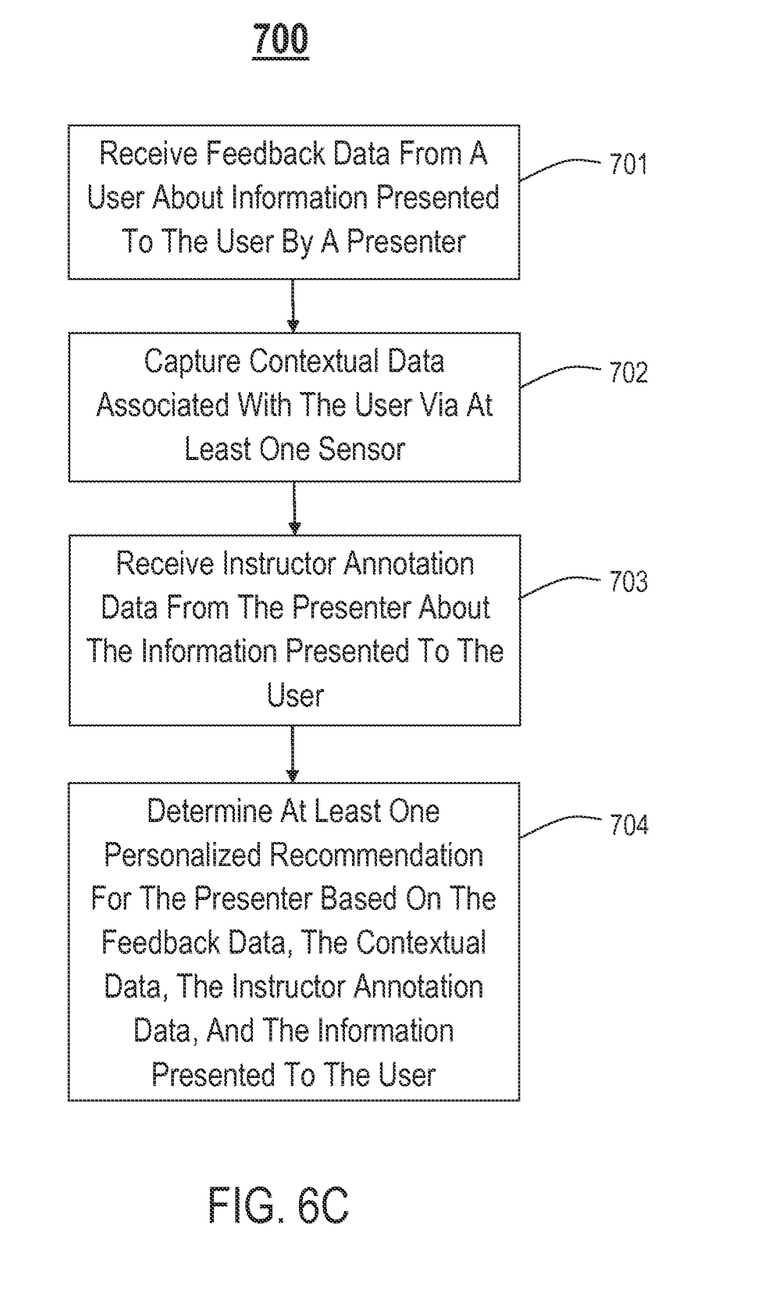
FIG. 6C illustrates a flowchart of an example process for providing personalized instructor recommendations, in accordance with an embodiment of the invention.

FIG. 6C illustrates a flowchart of an example process 700 for providing personalized instructor recommendations, in accordance with an embodiment of the invention. In process block 701, receive feedback data from a user about information presented to the user by a presenter. In process block 702, capture contextual data associated with the user via at least one sensor. In process block 703, receive instructor annotation data from the presenter about the information presented to the user. In process block 704, determine at least one personalized recommendation for the presenter based on the feedback data, the contextual data, the instructor annotation data, and the information presented to the user.

Figure 6D:
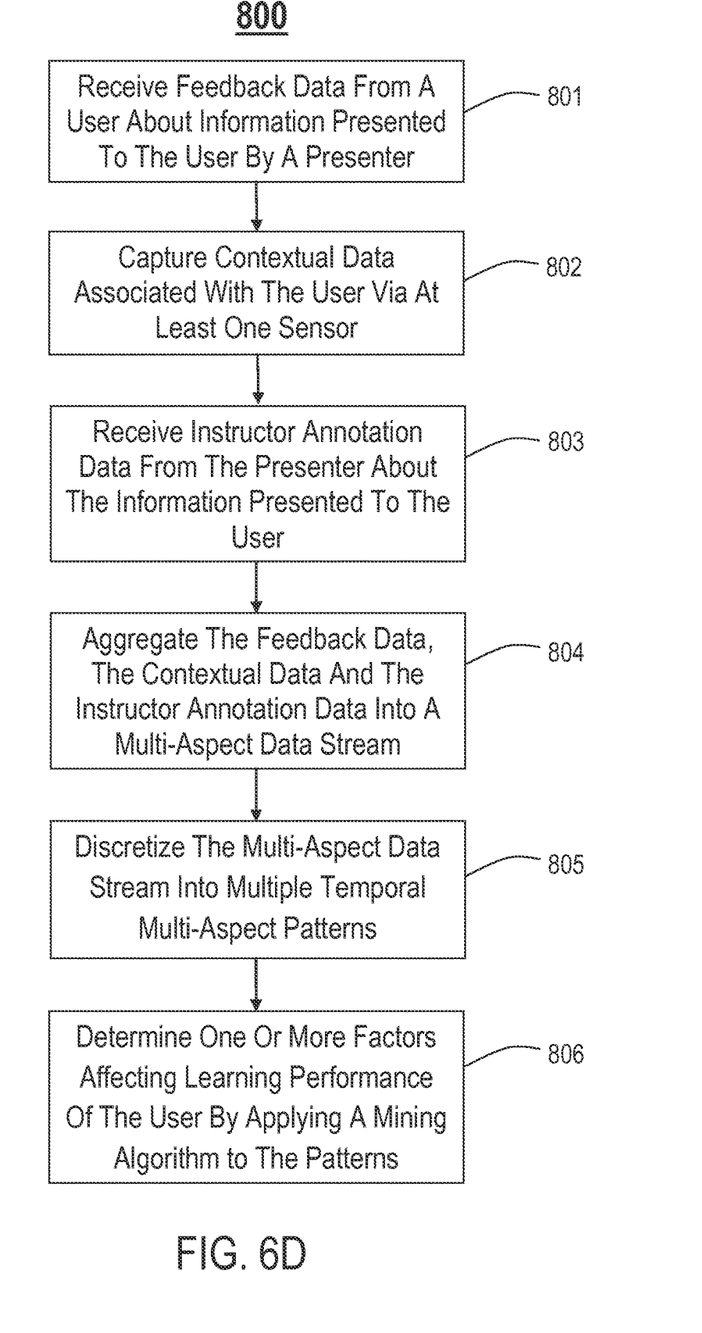
FIG. 6D illustrates a flowchart of an example process for determining factors affecting learning performance, in accordance with an embodiment of the invention.

FIG. 6D illustrates a flowchart of an example process 800 for determining factors affecting learning performance, in accordance with an embodiment of the invention. In process block 801, receive feedback data from a user about information presented to the user by a presenter. In process block 802, capture contextual data associated with the user via at least one sensor. In process block 803, receive instructor annotation data from the presenter about the information presented to the user. In process block 804, aggregate the feedback data, the contextual data and the instructor annotation data into a multi-aspect data stream. In process block 805, discretize the multi-aspect data stream into multiple temporal multi-aspect patterns. In process block 806, determine one or more factors affecting learning performance of the user by applying a mining algorithm to the patterns.

Figure 7:
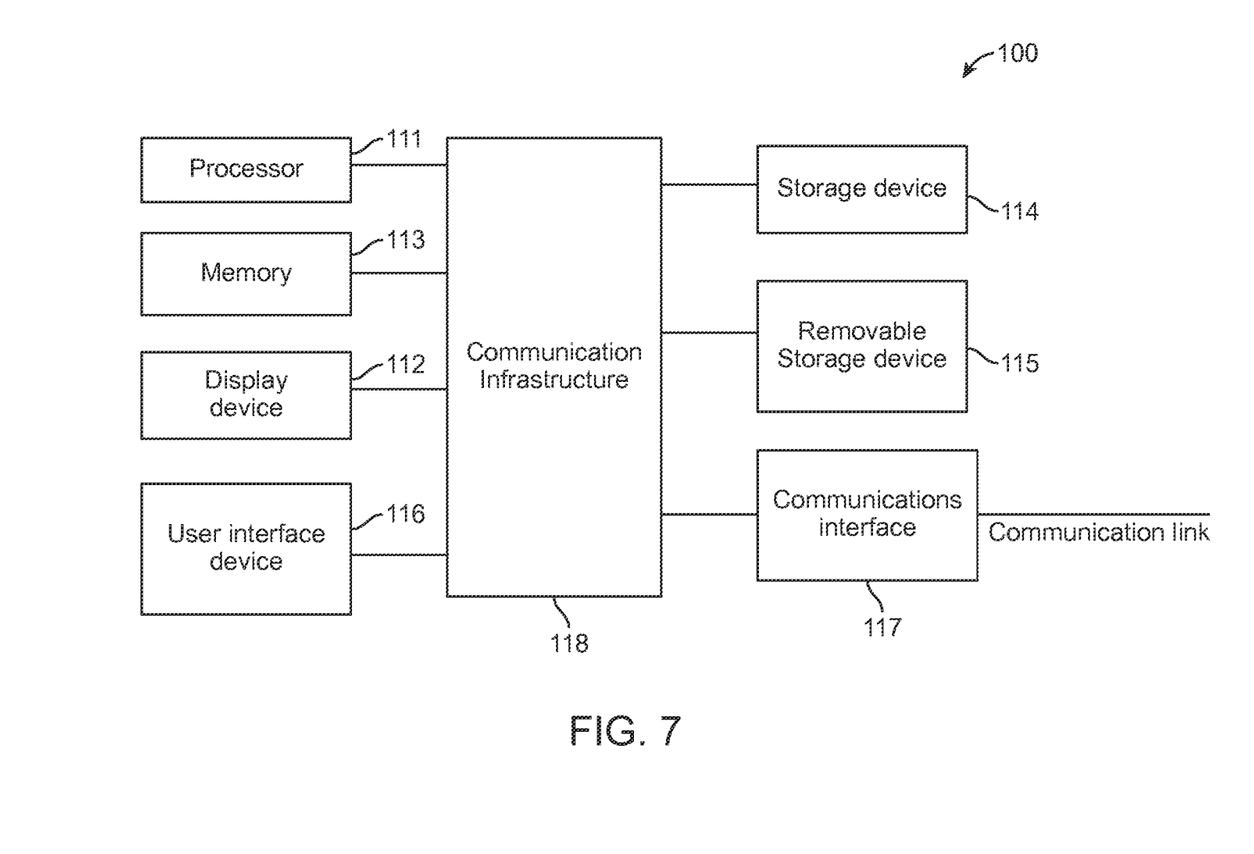
FIG. 7 is a high level block diagram showing an information processing system comprising a computer system useful for implementing an embodiment of the present invention.

FIG. 7 is a high level block diagram showing an information processing system comprising a computer system 100 useful for implementing an embodiment of the present invention. The computer system 100 includes one or more processors 111, and can further include an electronic display device 112 (for displaying graphics, text, and other data), a main memory 113 (e.g., random access memory (RAM)), storage device 114 (e.g., hard disk drive), removable storage device 115 (e.g., removable storage drive, removable memory module, a magnetic tape drive, optical disk drive, computer readable medium having stored therein computer software and/or data), user interface device 116 (e.g., keyboard, touch screen, keypad, pointing device), and a communication interface 117 (e.g., modem, a network interface (such as an Ethernet card), a communications port, or a PCMCIA slot and card). The communication interface 117 allows software and data to be transferred between the computer system and external devices. The system 100 further includes a communications infrastructure 118 (e.g., a communications bus, network) to which the aforementioned devices/modules 111 through 117 are connected.

Information transferred via communications interface 117 may be in the form of signals such as electronic, electromagnetic, optical, or other signals capable of being received by communications interface 117, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, web servers, etc. Further, embodiments of said architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the one or more embodiments have been described with reference to certain versions thereof; however, other versions are possible. Therefore, the spirit and scope of the appended claims should not be limited to the description of the preferred versions contained herein.

What is claimed is:

1. A system, comprising:
   at least one processor; and
   a non-transitory processor-readable memory device storing instructions that when executed by the at least one processor causes the at least one processor to perform operations including:
   receiving feedback data from an electronic device, wherein the feedback data comprises feedback on a presentation;
   receiving contextual data from the electronic device, wherein the contextual data is indicative of an environmental context associated with the electronic device;
   aggregating the feedback data and the contextual data into a multi-aspect data stream discretized into multiple temporal multi-aspect patterns;
   determining a personalized recommendation for display on the electronic device based on the multiple temporal multi-aspect patterns, wherein the personalized recommendation is associated with increasing understanding of a user of the electronic device of information presented during the presentation; and
   determining a different personalized recommendation for display on a different electronic device based on the multiple temporal multi-aspect patterns, wherein the different personalized recommendation is associated with increasing effectiveness of a different user of the different electronic device in presenting the information presented during the presentation.

2. The system of claim 1, wherein the operations further comprise:
   receiving instructor annotation data from the different electronic device, wherein the instructor annotation data comprises an instructor annotation for the presented information, and the different personalized recommendation is further based on the instructor annotation data.

3. The system of claim 1, wherein determining a personalized recommendation comprises:
   determining a factor affecting learning performance of the user of the electronic device, wherein the learning performance is indicative of understanding of the user in the presented information, and the personalized recommendation is further based on the factor determined.

4. The system of claim 3, wherein the personalized recommendation comprises a personalized learning recommendation for improving the learning performance of the user.

5. The system of claim 4, wherein the personalized learning recommendation comprises one or more of the following: a recommendation to review additional information related to the presented information, or a recommendation to adjust an environmental factor affecting the learning performance of the user.

6. The system of claim 2, wherein the different personalized recommendation is for the different user of the different electronic device, the different user is a presenter of the presentation, and the different personalized recommendation is further based on the presented information.

7. The system of claim 6, wherein the operations further comprise:
   providing the different personalized recommendation to the different electronic device for display.

8. The system of claim 6, wherein the different personalized recommendation comprises a personalized instructor recommendation for improving instructor performance of the presenter, and the instructor performance is indicative of effectiveness of the presenter in presenting the presentation.

9. The system of claim 1, wherein the different personalized recommendation is for a management entity, and the different personalized recommendation is further based on the presented information.

10. The system of claim 9, wherein the different personalized recommendation comprises a personalized management recommendation for improving learning performance at an institution managed by the management entity, and the learning performance is indicative of understanding of one or more students or trainees of the institution in the presented information.

11. The system of claim 1, wherein:
    the contextual data comprises data identifying one or more environmental conditions of an environment surrounding the user of the electronic device.

12. The system of claim 2, wherein:
    the instructor annotation data comprises one or more of the following: information identifying a particular topic associated with the presented information, information identifying a particular activity associated with the presented information, or one or more learning prerequisites associated with the presented information.

13. The system of claim 1, wherein determining a personalized recommendation comprises:
    determining one or more factors affecting learning performance of the user of the electronic device by applying a mining algorithm to the multiple temporal multi-aspect patterns, wherein the personalized recommendation is further based on the one or more factors determined, and the learning performance is indicative of understanding of the user in the presented information.

14. A method, comprising:
    receiving feedback data from an electronic device, wherein the feedback data comprises feedback on a presentation;
    receiving contextual data from the electronic device, wherein the contextual data is indicative of an environmental context associated with the electronic device;
    aggregating the feedback data and the contextual data into a multi-aspect data stream discretized into multiple temporal multi-aspect patterns;
    determining a personalized recommendation for display on the electronic device based on the multiple temporal multi-aspect patterns, wherein the personalized recommendation is associated with increasing understanding of a user of the electronic device of information presented during the presentation; and
    determining a different personalized recommendation for display on a different electronic device based on the multiple temporal multi-aspect patterns, wherein the different personalized recommendation is associated with increasing effectiveness of a different user of the different electronic device in presenting the information presented during the presentation.

15. The method of claim 14, further comprising:
receiving instructor annotation data from the different electronic device, wherein the instructor annotation data comprises an instructor annotation for the presented information, and the different personalized recommendation is further based on the instructor annotation data.

16. The method of claim 15, wherein the different personalized recommendation is for the different user of the different electronic device, the different user is a presenter of the presentation, the different personalized recommendation is further based on the presented information, the different personalized recommendation comprises a personalized instructor recommendation for improving instructor performance of the presenter, and the instructor performance is indicative of effectiveness of the presenter in presenting the presentation.

17. The method of claim 14, wherein the different personalized recommendation is for a management entity, the different personalized recommendation is further based on the presented information, the different personalized recommendation comprises a personalized management recommendation for improving learning performance at an institution managed by the management entity, and the learning performance is indicative of understanding of one or more students or trainees of the institution in the presented information.

18. The method of claim 14, wherein the personalized recommendation comprises a personalized learning recommendation for improving learning performance of the user of the electronic device, and the learning performance is indicative of understanding of the user in the presented information.

19. The method of claim 15, wherein determining a personalized recommendation comprises:
determining one or more factors affecting learning performance of the user of the electronic device by applying a mining algorithm to the multiple temporal multi-aspect patterns, wherein the personalized recommendation is further based on the one or more factors determined, and the learning performance is indicative of understanding of the user in the presented information.

20. A non-transitory computer-readable medium having instructions which when executed on a computer perform a method comprising:
receiving feedback data from an electronic device, wherein the feedback data comprises feedback on a presentation;
receiving contextual data from the electronic device, wherein the contextual data is indicative of an environmental context associated with the electronic device;
aggregating the feedback data and the contextual data into a multi-aspect data stream discretized into multiple temporal multi-aspect patterns;
determining a personalized recommendation for display on the electronic device based on the multiple temporal multi-aspect patterns, wherein the personalized recommendation is associated with increasing understanding of a user of the electronic device of information presented during the presentation; and
determining a different personalized recommendation for display on a different electronic device based on the multiple temporal multi-aspect patterns, wherein the different personalized recommendation is associated with increasing effectiveness of a different user of the different electronic device in presenting the information presented during the presentation.

* * * * *